US012603964B2

(12) United States Patent (10) Patent No.: US 12,603,964 B2

Shionoiri (45) Date of Patent: Apr. 14, 2026

(54) INFORMATION PROCESSING APPARATUS, NON-TRANSITORY COMPUTER READABLE MEDIUM STORING PROGRAM, AND INFORMATION PROCESSING METHOD FOR MANAGING MAINTENANCE OPERATION PERMISSION

(71) Applicant: FUJIFILM Business Innovation Corp., Tokyo (JP)

(72) Inventor: Hirochika Shionoiri, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 452 days.

(21) Appl. No.: 17/899,578

(22) Filed: Aug. 30, 2022

(65) Prior Publication Data

US 2023/0308591 A1 Sep. 28, 2023

(30) Foreign Application Priority Data

Mar. 24, 2022 (JP) ................................. 2022-048559

(51) Int. Cl.
*H04N 1/44* (2006.01)
*G06Q 10/20* (2023.01)
*H04N 1/00* (2006.01)

(52) U.S. Cl.
CPC ........... *H04N 1/4433* (2013.01); *G06Q 10/20* (2013.01); *H04N 1/00344* (2013.01);
(Continued)

(58) Field of Classification Search
CPC ............. H04N 1/4433; H04N 1/00204; H04N 1/00344; H04N 1/00832; H04N 1/00912; H04N 1/00973; G06Q 10/20; G06F 16/21
See application file for complete search history.

(56) References Cited

U.S. PATENT DOCUMENTS 6,845,148 B1 * 1/2005 Beamon .............. H04M 3/2254
379/32.01
2003/0063742 A1 * 4/2003 Neufeld ................ H04L 9/0838
380/46
(Continued)

FOREIGN PATENT DOCUMENTS

JP 2002055821 2/2002
JP 2004038440 2/2004
(Continued)

OTHER PUBLICATIONS

"Notice of Reasons for Refusal of Japan Counterpart Application No. 2022-048559", issued on Feb. 3, 2026, with English translation thereof, p. 1-p.9.

*Primary Examiner* — Juan M Guillermety
(74) *Attorney, Agent, or Firm* — JCIPRNET

(57) ABSTRACT

An information processing apparatus includes a processor configured to assign a maintenance worker operation permission of a maintenance work applied for in advance for the information processing apparatus in accordance with an input received from a manager user, and after a return from a restart, cancel the operation permission in a case where the maintenance work applied for in advance is finished, and maintain a state of the assigned operation permission in a case where the maintenance work applied for in advance is not finished.

16 Claims, 6 Drawing Sheets

(52) U.S. Cl.
CPC ..... *H04N 1/00832* (2013.01); *H04N 1/00912*
(2013.01); *H04N 1/00973* (2013.01)

(56) References Cited

U.S. PATENT DOCUMENTS

| | | | |
|---|---|---|---|
| 2004/0006631 A1 | 1/2004 | Nonaka et al. | |
| 2012/0296685 A1* | 11/2012 | Nishimura ....... | G06Q 10/06311 |
| | | | 705/7.15 |
| 2013/0227676 A1* | 8/2013 | Guo ........................ | G06F 21/31 |
| | | | 726/17 |
| 2016/0335414 A1* | 11/2016 | Isaacs ................. | G06F 11/0766 |
| 2017/0269883 A1* | 9/2017 | Nakai ................... | G06F 3/1234 |

FOREIGN PATENT DOCUMENTS

| | | |
|---|---|---|
| JP | 2009258820 | 11/2009 |
| JP | 2020141251 | 9/2020 |

\* cited by examiner

FIG. 4

| ITEM OF MAINTENANCE WORK | WORK PROCEDURE | | | UPDATED DATA ITEM | | |
|---|---|---|---|---|---|---|
| | 1 | 2 | ... | 1 | 2 | ... |
| TONER REPLACEMENT | TONER INSTALLATION | COPYING | ... | TONER DATA | 2 | ... |
| DRUM REPLACEMENT | DRUM INSTALLATION | OPERATION X | ... | DRUM DATA | – | ... |
| IMAGE QUALITY ADJUSTMENT | CORRECTION CHART PRINTING | IMAGE QUALITY CORRECTION | ... | – | SYSTEM DATA X | ... |
| | | | | | SYSTEM DATA Y | |
| ... | | ... | | ... | ... | |

FIG. 5

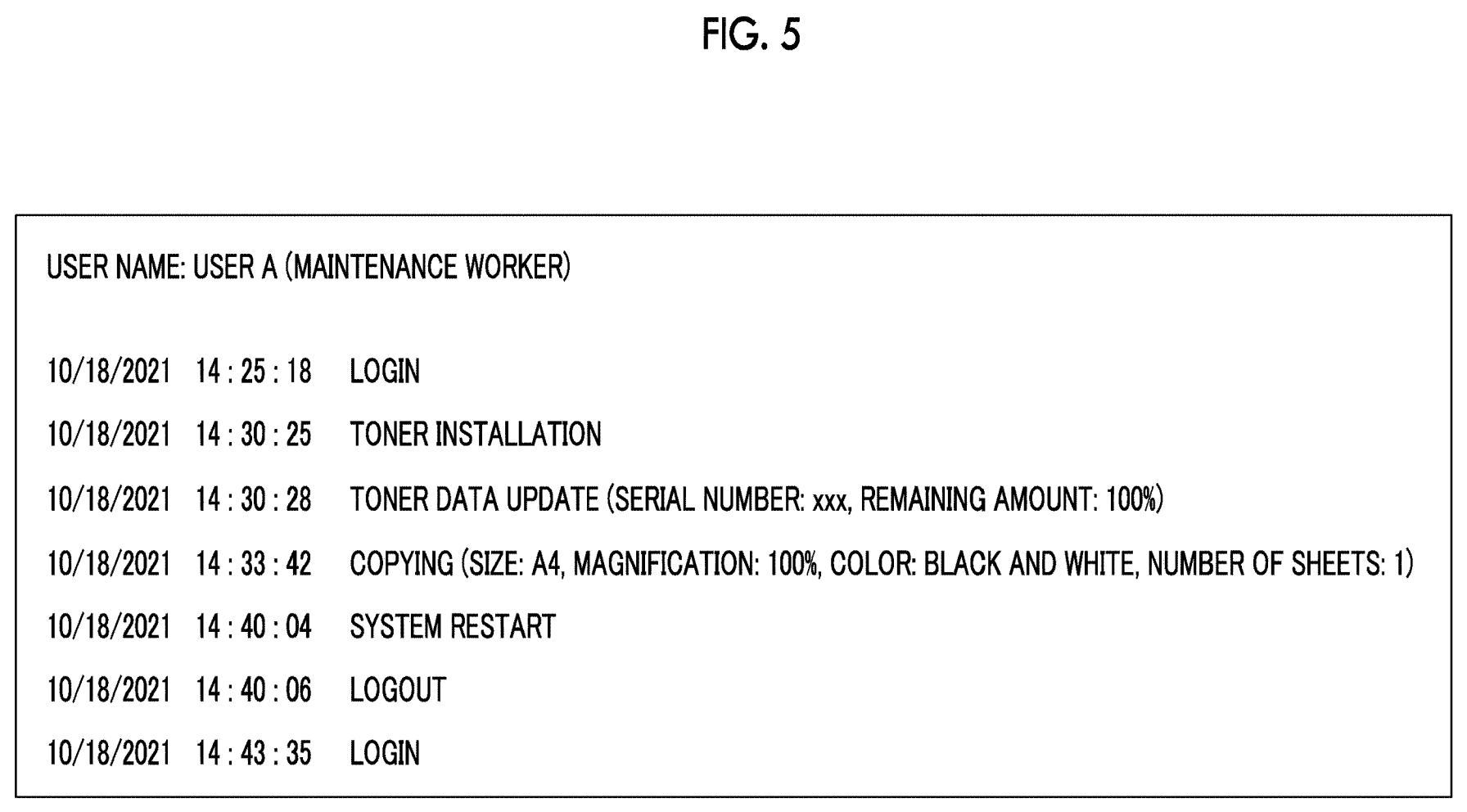

USER NAME: USER A (MAINTENANCE WORKER)

10/18/2021   14 : 25 : 18    LOGIN

10/18/2021   14 : 30 : 25    TONER INSTALLATION

10/18/2021   14 : 30 : 28    TONER DATA UPDATE (SERIAL NUMBER: xxx, REMAINING AMOUNT: 100%)

10/18/2021   14 : 33 : 42    COPYING (SIZE: A4, MAGNIFICATION: 100%, COLOR: BLACK AND WHITE, NUMBER OF SHEETS: 1)

10/18/2021   14 : 40 : 04    SYSTEM RESTART

10/18/2021   14 : 40 : 06    LOGOUT

10/18/2021   14 : 43 : 35    LOGIN

INFORMATION PROCESSING APPARATUS, NON-TRANSITORY COMPUTER READABLE MEDIUM STORING PROGRAM, AND INFORMATION PROCESSING METHOD FOR MANAGING MAINTENANCE OPERATION PERMISSION

CROSS-REFERENCE TO RELATED APPLICATIONS

This application is based on and claims priority under 35 USC 119 from Japanese Patent Application No. 2022-048559 filed Mar. 24, 2022.

BACKGROUND

(i) Technical Field

The present disclosure relates to an information processing apparatus, a non-transitory computer readable medium storing a program, and an information processing method.

(ii) Related Art

In the disclosure of JP2009-258820A, a worker obtains temporary access permission for a maintenance target apparatus by receiving approval from a manager in performing a maintenance work on the maintenance target apparatus.

SUMMARY

In performing a maintenance work on an information processing apparatus such as a multifunction peripheral by a maintenance worker, the work may be performed after operation permission for the information processing apparatus is assigned by obtaining approval from a manager user. In such a case, the maintenance work normally accompanies a restart of the information processing apparatus. Thus, the maintenance worker has to be assigned the operation permission for the information processing apparatus by obtaining reapproval of the manager user after the restart. However, each time the reapproval is obtained at each restart, efforts of the manager user and the maintenance worker are required.

Aspects of non-limiting embodiments of the present disclosure relate to an information processing apparatus, a non-transitory computer readable medium storing a program, and an information processing method that can eliminate need for reapproval of a manager user in a case where a maintenance worker performs a maintenance work accompanying a restart on an information processing apparatus for which operation permission is necessary.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to assign a maintenance worker operation permission of a maintenance work applied for in advance for the information processing apparatus in accordance with an input received from a manager user, and after a return from a restart, cancel the operation permission in a case where the maintenance work applied for in advance is finished, and maintain a state of the assigned operation permission in a case where the maintenance work applied for in advance is not finished.

BRIEF DESCRIPTION OF THE DRAWINGS

Exemplary embodiment(s) of the present invention will be described in detail based on the following figures, wherein:

FIG. 4 is a diagram illustrating an example of a work procedure management table managed in the image forming apparatus of the exemplary embodiment of the present disclosure;

FIG. 5 is a diagram illustrating an example of operation logs managed in the image forming apparatus of the exemplary embodiment of the present disclosure.

DETAILED DESCRIPTION

Figure 1:
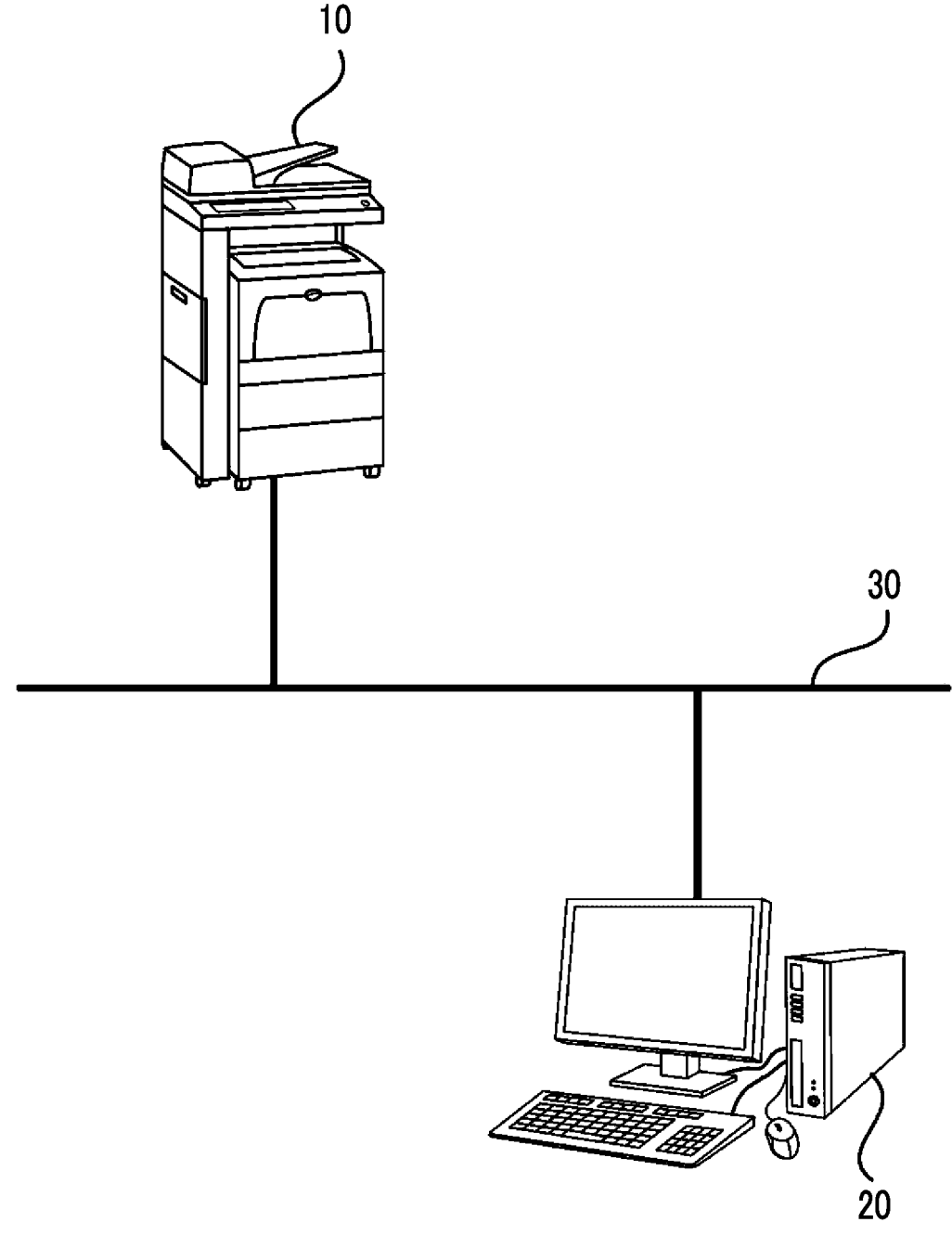
FIG. 1 is a diagram illustrating a system configuration of an image forming system of an exemplary embodiment of the present disclosure.

Hereinafter, an exemplary embodiment of the technology of the present disclosure will be described in detail with reference to the drawings. FIG. 1 is a diagram illustrating a system configuration of an image forming system of the exemplary embodiment.

As illustrated in FIG. 1, the image forming system of the present exemplary embodiment is configured with an image forming apparatus 10 and a terminal apparatus 20 connected to each other through a network 30.

The terminal apparatus 20 generates printing data and transmits the generated printing data to the image forming apparatus 10 through the network 30. In addition, the terminal apparatus 20 transmits an instruction to approve a maintenance work or cancel the approval for a maintenance worker of the image forming apparatus 10 to the image forming apparatus 10 in accordance with an instruction input from a manager user.

The image forming apparatus 10 receives the printing data transmitted from the terminal apparatus 20 and outputs an image corresponding to the printing data on a paper sheet. The image forming apparatus 10 is an apparatus referred to as a so-called multifunction peripheral having a plurality of functions such as a printing function, a scanning function, a copying function, and a facsimile function. In addition, the image forming apparatus 10 approves the maintenance work or cancels the approval for the maintenance worker of the image forming apparatus 10 based on an instruction to approve the maintenance work or cancel the approval received from the terminal apparatus 20. The image forming apparatus 10 is an example of an information processing apparatus according to the exemplary embodiment of the present disclosure.

Figure 2:
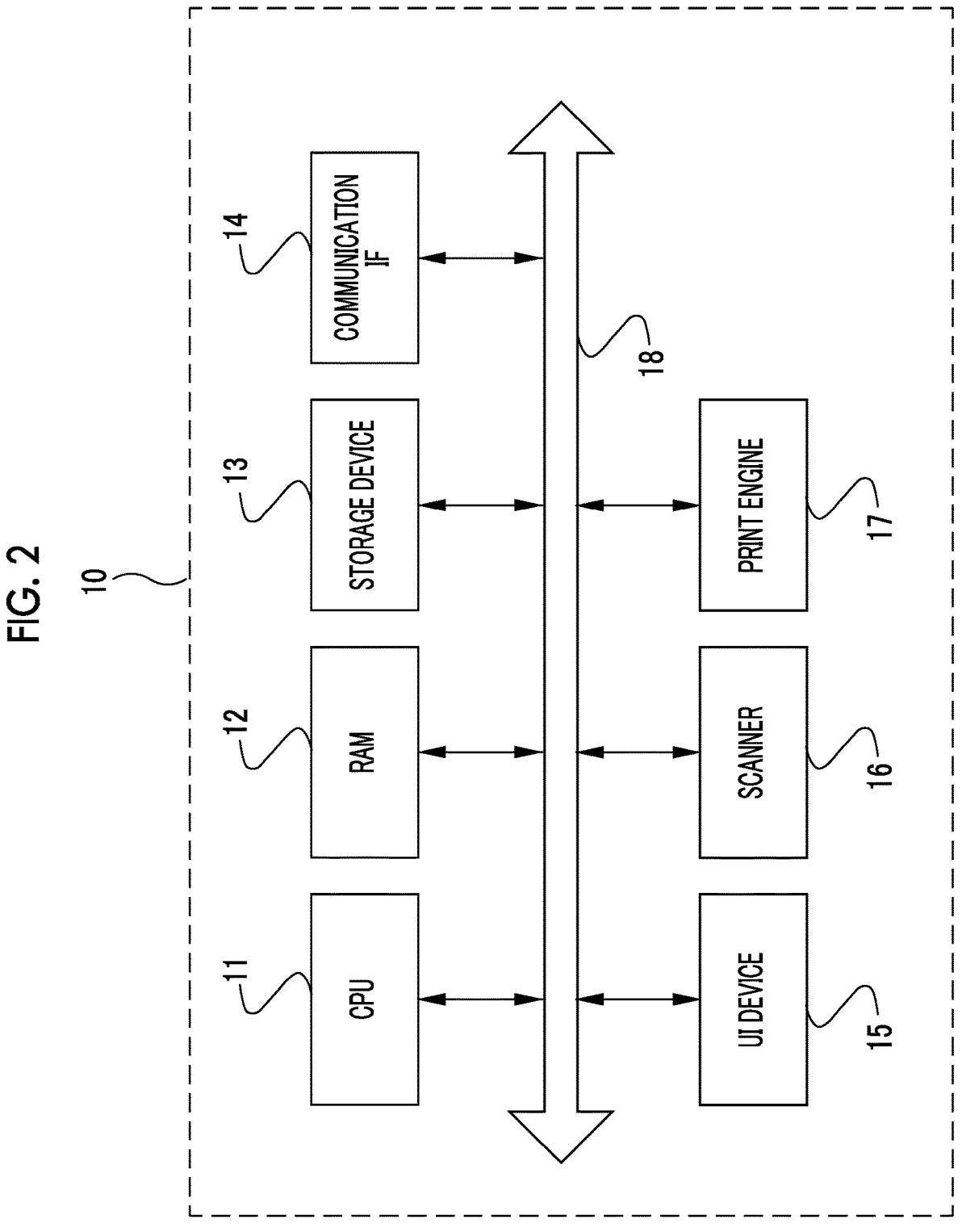
FIG. 2 is a block diagram illustrating a hardware configuration of an image forming apparatus of the exemplary embodiment of the present disclosure.

Next, a hardware configuration of the image forming apparatus 10 in a data processing system of the present exemplary embodiment is illustrated in FIG. 2.

As illustrated in FIG. 2, the image forming apparatus 10 includes a central processing unit (CPU) 11, a random access memory (RAM) 12, a storage device 13 such as a hard disk drive, a communication interface (abbreviated to IF) 14, a user interface (abbreviated to UI) device 15 including a touch panel or a liquid crystal display and a keyboard, a scanner 16, and a print engine 17. These constituents are connected to each other via a control bus 18.

The communication IF 14 transmits and receives data to and from the external apparatus or the like via the network 30. The UI device 15 receives an instruction input from the user. The scanner 16 scans an original document loaded in the image forming apparatus 10 as image data. The print engine 17 prints an image on a recording medium such as a printing paper sheet through steps of electrostatic charging, exposure, development, transfer, fixing, and the like.

The CPU 11 is a processor that controls an operation of the image forming apparatus 10 by executing a predetermined process based on a control program stored in the RAM 12 or the storage device 13. In the present exemplary embodiment, while the CPU 11 reads and executes the control program stored in the RAM 12 or the storage device 13, the present disclosure is not limited thereto. The control program may be provided in the form of a recording on a computer readable recording medium. For example, the program may be provided in the form of a recording on an optical disc such as a compact disc (CD)-read only memory (ROM) and a digital versatile disc (DVD)-ROM or in the form of a recording on a semiconductor memory such as a universal serial bus (USB) memory and a memory card. In addition, the control program may be acquired from the external apparatus via a communication line connected to the communication interface 14.

Figure 3:
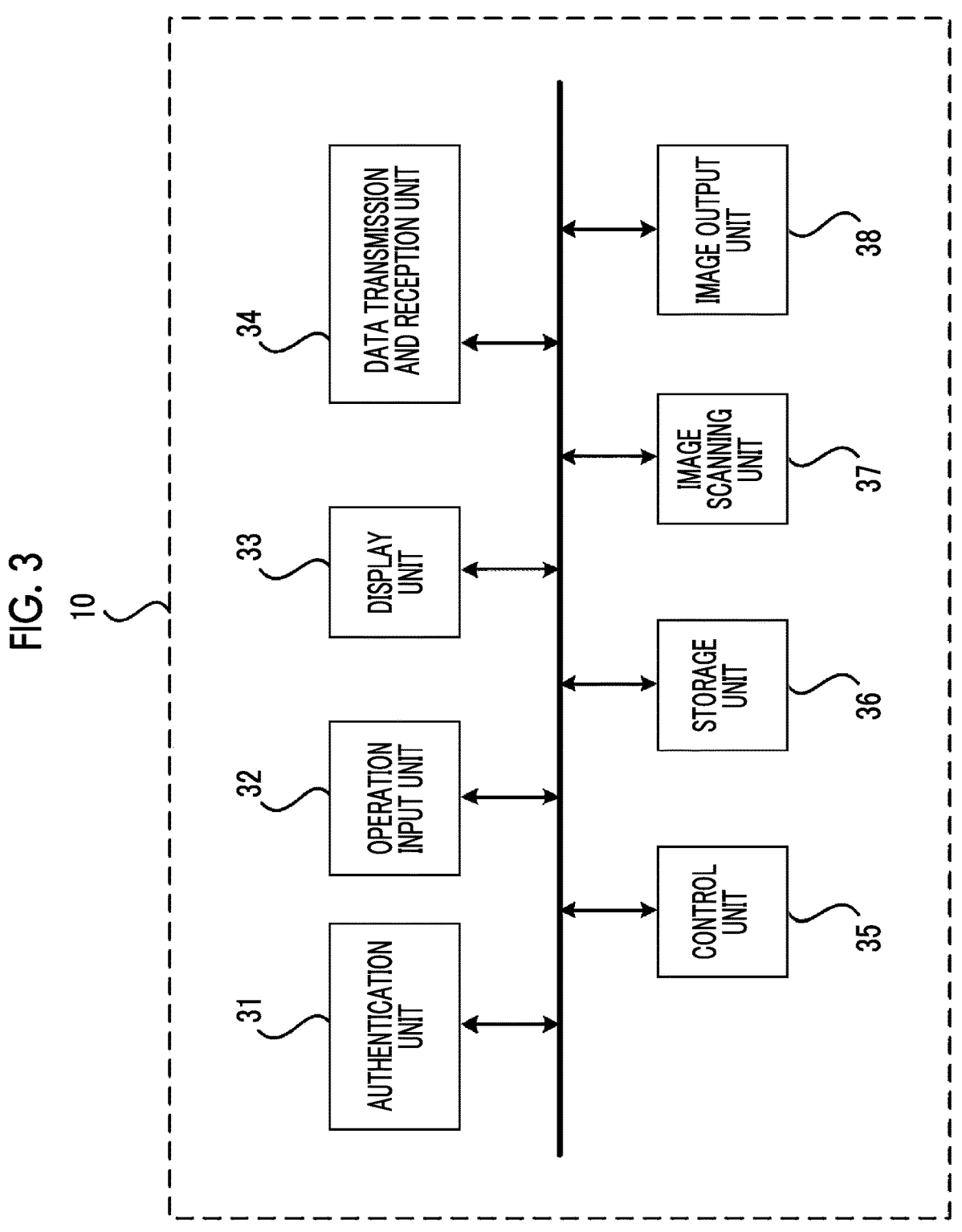
FIG. 3 is a block diagram illustrating a functional configuration of the image forming apparatus of the exemplary embodiment of the present disclosure.

FIG. 3 is a block diagram illustrating a functional configuration of the image forming apparatus 10 implemented by executing the control program.

As illustrated in FIG. 3, the image forming apparatus 10 of the present exemplary embodiment includes an authentication unit 31, an operation input unit 32, a display unit 33, a data transmission and reception unit 34, a control unit 35, a storage unit 36, an image scanning unit 37, and an image output unit 38.

The authentication unit 31 executes an authentication process for a user who wants to utilize the image forming apparatus 10. The operation input unit 32 inputs information about various operations performed by the user. The display unit 33 is controlled by the control unit 35 and displays various information to the user. The data transmission and reception unit 34 transmits and receives data to and from the external apparatus such as the terminal apparatus 20.

The control unit 35 controls an overall operation of the image forming apparatus 10 and performs a control of scanning an original document image by the image scanning unit 37, a control of outputting the printing data from the image output unit 38, and the like based on the instruction input from the user.

The storage unit 36 stores not only the control program but also data such as the work procedure management table in which information about a work procedure of the maintenance work is managed for each type of the maintenance work, and operation logs that are operation history information. The work procedure management table and the operation logs will be described in detail later. The storage unit 36 is an example of a memory according to the exemplary embodiment of the present disclosure.

The image scanning unit 37 scans the original document image from the loaded original document under control of the control unit 35. The image output unit 38 outputs the image onto the recording medium such as a printing paper sheet under control of the control unit 35.

In the image forming apparatus 10 of the present exemplary embodiment, in performing the maintenance work on the image forming apparatus 10 by the maintenance worker, the maintenance work needs to be performed after operation permission of the maintenance work for the image forming apparatus 10 is assigned by obtaining approval from the manager user. A process of the control unit 35 in approving the maintenance work or canceling the approval for the maintenance worker in the image forming apparatus 10 will be described below.

In accordance with an input received from the manager user, the control unit 35 assigns the maintenance worker the operation permission of the maintenance work applied for in advance for the image forming apparatus 10 and, after a return from a restart, cancels the operation permission in a case where the maintenance work applied for in advance is finished, and maintains a state of the assigned operation permission in a case where the maintenance work applied for in advance is not finished.

In the image forming apparatus 10 of the present exemplary embodiment, in a case where the maintenance worker is assigned the operation permission, the control unit 35 may acquire the information about the work procedure for executing the maintenance work applied for, acquire the operation history information in which an operation content executed up to the present by the maintenance worker is recorded after the return from the restart, compare the acquired operation history information with the information about the work procedure of the maintenance work being executed by the maintenance worker, cancel the operation permission in a case where the maintenance work applied for in advance is finished, and maintain the state of the assigned operation permission in a case where the maintenance work applied for in advance is not finished.

In addition, the control unit 35 acquires the information about the work procedure corresponding to the type of maintenance work for which the maintenance worker is assigned the operation permission by the manager user, from the information about the work procedure stored in the storage unit 36.

In addition, the information about the work procedure and the operation logs may include system data that is information related to a state of the image forming apparatus 10.

Hereinafter, a process in the image forming apparatus 10 of the present exemplary embodiment will be described in detail. FIG. 4 is a diagram illustrating an example of the work procedure management table managed in the image forming apparatus 10. FIG. 5 is a diagram illustrating an example of the operation logs managed in the image forming apparatus 10.

In the image forming apparatus 10, the work procedure management table illustrated in FIG. 4 is stored in advance in the storage unit 36. In the work procedure management table, information such a "work procedure" and "updated data item" is managed for each item of the maintenance work.

The "work procedure" is information in which an operation performed in each item of the maintenance work is managed in order of operations. In the work procedure management table in FIG. 4, operations after the third are omitted. For example, in the maintenance work of toner replacement, first, new toner installation is performed, and second, copying is performed in order to check a state of the new toner. Here, the toner is a toner cartridge loaded with a toner. In addition, in the maintenance work of drum replacement, first, new drum installation is performed, and second, an operation X is performed in order to check a state of the new drum. Here, the drum is a drum cartridge including a photosensitive drum. In addition, in the maintenance work of image quality adjustment, first, a correction chart is printed, and second, image quality correction based on the correction chart is performed.

The "updated data item" is information in which a data item of system data of which a content is updated by each operation in the maintenance work is managed in association with each operation. Here, the system data includes not only various data related to the operation of the image forming apparatus 10 such as a program and setting parameters but also various resource data related to consumables such as a toner, a drum, and a paper sheet. In the work procedure management table in FIG. 4, system data after the third is omitted.

For example, in the maintenance work of toner replacement, in a case where new toner installation is performed as the first operation, toner data is updated in the image forming apparatus 10. Here, for example, the toner data is data such as a serial number and a remaining toner amount of the toner cartridge. In a case where copying is performed as the second operation, the system data is not updated.

In addition, in the maintenance work of drum replacement, in a case where new drum installation is performed as the first operation, drum data is updated in the image forming apparatus 10. Here, for example, the drum data is data such as a serial number and a used time of the drum cartridge. In a case where the operation X is performed as the second operation, system data X is updated.

In addition, in the maintenance work of image quality adjustment, in a case where the correction chart is printed as the first operation, the system data is not updated. In a case where the image quality correction is performed as the second operation, system data Y is updated.

In performing the maintenance work in the image forming apparatus 10, the maintenance worker applies for the item of the maintenance work and receives the approval of the maintenance work from the manager user of the image forming apparatus 10. The manager user transmits an approval instruction of the maintenance work of the item applied for to the image forming apparatus 10 via the terminal apparatus 20. The approval instruction transmitted from the terminal apparatus 20 includes information about the maintenance worker and information about the item of the maintenance work applied for. The maintenance worker logs in to the image forming apparatus 10 in performing the maintenance work in the image forming apparatus 10.

The control unit 35 refers to the work procedure management table stored in the storage unit 36 and acquires the information about the work procedure of the item applied for and information about the updated data item in accordance with the approval instruction received from the manager user. In addition, the control unit 35 assigns the maintenance worker the operation permission of the maintenance work of the item applied for.

Assigning the maintenance worker the operation permission of the maintenance work in the control unit 35 means permitting execution of at least an operation performed via software in the operation of the maintenance work. For example, various hardware operations such as toner installation and drum installation may be managed in the control unit 35 or may not be managed.

In a case of managing the hardware operations in the control unit 35, for example, a key with which locking and unlocking of a housing of the image forming apparatus 10 can be controlled by software may be provided. Accordingly, the control unit 35 can enable the maintenance worker to physically operate the hardware inside the image forming apparatus 10 by unlocking the housing with the key in a state where the maintenance work is approved. In addition, the control unit 35 can prevent the maintenance worker from physically operating the hardware inside the image forming apparatus 10 by locking the housing with the key in a state where the approval of the maintenance work is canceled.

In addition, in assigning the maintenance worker the operation permission of the maintenance work, the control unit 35 starts recording the operation logs and stores the operation logs in the storage unit 36. As illustrated in FIG. 5, the operation logs are information in which the operation content executed by the maintenance worker and a changed content of the system data are recorded in time-series order. After the recording of the operation logs is started, the recording of the operation logs is maintained until the maintenance work is finished even in a case where the image forming apparatus 10 is restarted, and a case where the maintenance worker logs in again.

The image forming apparatus 10 needs to be restarted during the maintenance work depending on a content of the maintenance work or the state of the image forming apparatus 10.

After the return from the restart of the image forming apparatus 10, the control unit 35 refers to the operation logs stored in the storage unit 36 and determines whether or not the maintenance work applied for in advance is finished by comparing the operation logs with the information about the work procedure and the information about the updated data item.

For example, in a case where the toner replacement is applied for as the item of the maintenance work, as illustrated in FIG. 4, first, new toner installation is performed, and second, copying is performed in order to check the state of the new toner in the work procedure of the toner replacement.

The control unit 35 refers to the operation logs and determines whether or not operations of toner installation and copying are performed and whether or not the corresponding system data is updated.

The example of the operation logs illustrated in FIG. 5 illustrates an example of the operation logs in a case where the toner replacement is performed. In these operation logs, performing the operations of toner installation and copying in this order and, furthermore, the update of the toner data in a case where toner installation is performed are perceived. In a case where contents of the operation logs match both of the information about the work procedure and the information about the updated data item, a determination that the maintenance work applied for is finished can be made.

The determination as to whether or not the maintenance work is finished may be performed by not only determining whether or not the system data is updated but also considering information as to whether or not the updated content is appropriate. For example, in a case where toner installation is performed, the toner data is updated. In a case where the remaining toner amount is not 100% in the updated toner data, the installed toner may be considered to be not new, and a determination that the maintenance work is not finished may be made.

In a case where the maintenance work applied for is finished, the control unit 35 cancels the approval of the manager user and cancels the operation permission assigned to the maintenance worker. In addition, in a case where the maintenance work applied for is not finished, the control unit 35 maintains a state of the approval of the manager user and maintains the state of the assigned operation permission for the maintenance worker.

Such an aspect eliminates need for reapproval by the manager user even in a case where the image forming apparatus 10 is restarted in the middle of the maintenance work.

In a case where the work of the maintenance worker is not normally performed, the control unit 35 may cancel the operation permission. Such an aspect can prevent the image forming apparatus 10 from being used outside a scope approved by the manager user.

In this case, in a case where the restart of the image forming apparatus 10 is repeated a predetermined number of times or more without progress in the maintenance work, the control unit 35 may cancel the operation permission. As a determination of the progress in the maintenance work, for example, the operation logs may be referred to, and a determination that there is no progress in the maintenance work may be made in a case where new operation logs are not recorded.

In addition, the control unit 35 may perform the authentication process for the maintenance worker each time the image forming apparatus 10 is restarted, and cancel the operation permission in a case where the authentication process fails. This authentication process is not limited to a normal authentication process using a user ID and a password assigned in advance to the maintenance worker and may be a process of setting a one-time password that only the maintenance worker receiving the approval knows and forcing identity check after the restart.

In addition, even in a case where the maintenance work applied for in advance is not finished after the return from the restart, the control unit 35 may cancel the operation permission in a case where a predetermined amount of time elapses from the assignment of the operation permission.

Figure 6:
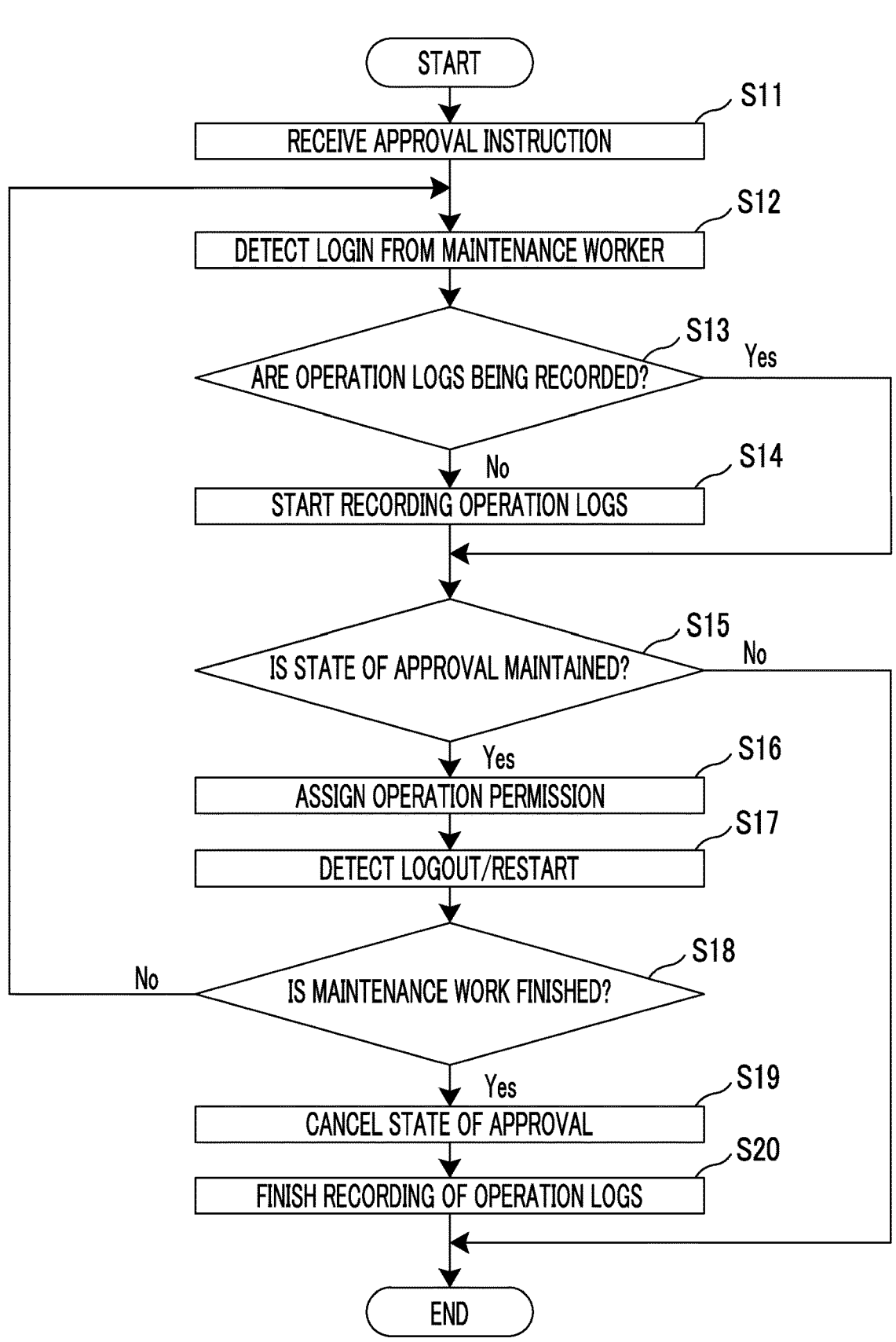
FIG. 6 is a flowchart for describing a flow of process in approving a maintenance work or canceling the approval for a maintenance worker in the image forming apparatus of the exemplary embodiment of the present disclosure.

Next, a flow of process in approving the maintenance work and canceling the approval for the maintenance worker in the image forming apparatus 10 of the present exemplary embodiment will be described with reference to the flowchart in FIG. 6.

In step S11, in a case where the approval instruction is received from the manager user via the terminal apparatus 20, the control unit 35 refers to the work procedure management table stored in the storage unit 36 and acquires the information about the work procedure of the item applied for and the information about the updated data item.

Next, in a case where a login from the maintenance worker approved by the manager user is detected in step S12, the control unit 35 determines whether or not the operation logs are being recorded in step S13.

In step S13, in a case where a determination that the operation logs are not being recorded is made, the control unit 35 starts recording the operation logs in step S14 and transitions to step S15. In step S13, in a case where a determination that the operation logs are being recorded is made, the control unit 35 directly transitions to step S15.

As described above, in a case where the work of the maintenance worker is not normally performed, the state of the approval of the manager user may be canceled. Thus, in step S15, the control unit 35 determines whether or not the state of the approval of the manager user is maintained.

In step S15, in a case where a determination that the state of the approval of the manager user is not maintained is made, the control unit 35 finishes the process not to receive the operation of the maintenance worker.

In step S15, in a case where a determination that the state of the approval of the manager user is maintained is made, the control unit 35 assigns the maintenance worker the operation permission of the item of the approved maintenance work in step S16.

In this state, the maintenance worker can perform the operation of the item of the maintenance work applied for to the manager user on the image forming apparatus 10. Here, the image forming apparatus 10 needs to be restarted during the maintenance work depending on the content of the maintenance work or the state of the image forming apparatus 10. In addition, the maintenance worker may log out from the image forming apparatus 10 during the maintenance work.

In step S17, in a case where the logout of the maintenance worker or the restart of the image forming apparatus 10 is detected, the control unit 35 determines whether or not the maintenance work is finished in step S18. In a case where the image forming apparatus 10 is restarted, the process in step S18 is performed after the return from the restart. Here, as described above, the determination as to whether or not the maintenance work is finished is performed by comparing the operation logs stored in the storage unit 36 with the information about the work procedure and the information about the updated data item.

In step S18, in a case where a determination that the maintenance work is not finished is made, the control unit 35 transitions to immediately before step S12 and waits until the maintenance worker logs in again.

In step S18, in a case where a determination that the maintenance work is finished is made, the control unit 35 cancels the approval of the manager user and cancels the operation permission assigned to the maintenance worker in step S19. The control unit 35 finishes the recording of the operation logs and finishes the series of processes in step S20.

MODIFICATION EXAMPLE

While the image forming system of the exemplary embodiment of the technology of the present disclosure is described above, the technology of the present disclosure is not limited to the exemplary embodiment and can be appropriately changed.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In addition, while the exemplary embodiment is described using a case of applying the technology of the present disclosure to the image forming apparatus, the technology of the present disclosure is not limited thereto and can be applied to various information processing apparatuses.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
assign a maintenance worker operation permission of a maintenance work applied for in advance for the information processing apparatus in accordance with an input received from a manager user;
perform a restart of the information processing apparatus; and
after a return from the restart, cancel the operation permission in a case where the maintenance work applied for in advance is finished, and maintain a state of the assigned operation permission in a case where the maintenance work applied for in advance is not finished, wherein the processor is further configured to:
in a case where the operation permission is assigned to the maintenance worker, acquire information about a work procedure for executing the maintenance work applied for,
after the return from the restart, acquire operation history information in which an operation content executed up to the present by the maintenance worker is recorded, and
compare the acquired operation history information with the information about the work procedure of the maintenance work being executed by the maintenance worker, cancel the operation permission in a case where the maintenance work applied for in advance is finished, and maintain the state of the assigned operation permission in a case where the maintenance work applied for in advance is not finished.

2. The information processing apparatus according to claim 1, further comprising:
a memory,
wherein the memory stores the information about the work procedure of the maintenance work for each type of the maintenance work, and
the processor is configured to acquire information about a work procedure corresponding to a type of the maintenance work for which the maintenance worker is assigned the operation permission by the manager user, from the information about the work procedure stored in the memory.

3. The information processing apparatus according to claim 2,
wherein the information about the work procedure and the operation history information include information related to a state of the information processing apparatus.

4. The information processing apparatus according to claim 3, wherein the processor is configured to:
cancel the operation permission in a case where a work of the maintenance worker is not normally performed.

5. The information processing apparatus according to claim 4, wherein the processor is configured to:
cancel the operation permission in a case where the restart of the information processing apparatus is repeated a predetermined number of times or more without progress in the maintenance work.

6. The information processing apparatus according to claim 2, wherein the processor is configured to:
cancel the operation permission in a case where a work of the maintenance worker is not normally performed.

7. The information processing apparatus according to claim 6, wherein the processor is configured to:
cancel the operation permission in a case where the restart of the information processing apparatus is repeated a predetermined number of times or more without progress in the maintenance work.

8. The information processing apparatus according to claim 1,
wherein the information about the work procedure and the operation history information include information related to a state of the information processing apparatus.

9. The information processing apparatus according to claim 8, wherein the processor is configured to:
cancel the operation permission in a case where a work of the maintenance worker is not normally performed.

10. The information processing apparatus according to claim 9, wherein the processor is configured to:
cancel the operation permission in a case where the restart of the information processing apparatus is repeated a predetermined number of times or more without progress in the maintenance work.

11. The information processing apparatus according to claim 1, wherein the processor is configured to:
cancel the operation permission in a case where a work of the maintenance worker is not normally performed.

12. The information processing apparatus according to claim 11, wherein the processor is configured to:
cancel the operation permission in a case where the restart of the information processing apparatus is repeated a predetermined number of times or more without progress in the maintenance work.

13. The information processing apparatus according to claim 11, wherein the processor is configured to:
perform an authentication process for the maintenance worker each time the information processing apparatus is restarted, and cancel the operation permission in a case where the authentication process fails.

14. The information processing apparatus according to claim 11, wherein the processor is configured to:
even in a case where the maintenance work applied for in advance is not finished after the return from the restart, cancel the operation permission in a case where a predetermined amount of time elapses from the assignment of the operation permission.

15. A non-transitory computer readable medium storing a program causing a computer to execute a process comprising:
assigning a maintenance worker operation permission of a maintenance work applied for in advance for the information processing apparatus in accordance with an input received from a manager user;
performing a restart of the information processing apparatus; and
canceling, after a return from the restart, the operation permission in a case where the maintenance work applied for in advance is finished, and maintaining a state of the assigned operation permission in a case where the maintenance work applied for in advance is not finished, wherein the process further comprises:

in a case where the operation permission is assigned to the maintenance worker, acquiring information about a work procedure for executing the maintenance work applied for, after the return from the restart, acquiring operation history information in which an operation content executed up to the present by the maintenance worker is recorded, and comparing the acquired operation history information with the information about the work procedure of the maintenance work being executed by the maintenance worker, cancelling the operation permission in a case where the maintenance work applied for in advance is finished, and maintaining the state of the assigned operation permission in a case where the maintenance work applied for in advance is not finished.

16. An information processing method comprising:

assigning a maintenance worker operation permission of a maintenance work applied for in advance for the information processing apparatus in accordance with an input received from a manager user;

performing a restart of the information processing apparatus;

canceling, after a return from the restart, the operation permission in a case where the maintenance work applied for in advance is finished; and maintaining a state of the assigned operation permission in a case where the maintenance work applied for in advance is not finished, wherein the method further comprises:

in a case where the operation permission is assigned to the maintenance worker, acquiring information about a work procedure for executing the maintenance work applied for, after the return from the restart, acquiring operation history information in which an operation content executed up to the present by the maintenance worker is recorded, and comparing the acquired operation history information with the information about the work procedure of the maintenance work being executed by the maintenance worker, cancelling the operation permission in a case where the maintenance work applied for in advance is finished, and maintaining the state of the assigned operation permission in a case where the maintenance work applied for in advance is not finished.

* * * * *